(12) United States Patent
Chen

(10) Patent No.: US 8,241,055 B2
(45) Date of Patent: Aug. 14, 2012

(54) PATCH PANEL ASSEMBLY AND PATCHING MODULE THEREOF

(75) Inventor: Chou-Hsing Chen, Keelung (TW)

(73) Assignee: Surtec Industries Inc., Keelung (TW)

(*) Notice: Subject to any disclaimer, the term of this patent is extended or adjusted under 35 U.S.C. 154(b) by 444 days.

(21) Appl. No.: 12/605,855

(22) Filed: Oct. 26, 2009

(65) Prior Publication Data

US 2011/0097924 A1    Apr. 28, 2011

(51) Int. Cl.
*H01R 4/24* (2006.01)
(52) U.S. Cl. .................................. 439/404; 439/540.1
(58) Field of Classification Search .................. None
See application file for complete search history.

(56) References Cited

U.S. PATENT DOCUMENTS

| | | | | |
|---|---|---|---|---|
| 6,767,241 | B1 * | 7/2004 | Abel et al. | 439/417 |
| 7,288,001 | B1 * | 10/2007 | Aekins | 439/540.1 |
| 7,455,548 | B2 * | 11/2008 | Clark et al. | 439/534 |
| 7,896,692 | B2 * | 3/2011 | Gibson et al. | 439/540.1 |
| 8,096,839 | B2 * | 1/2012 | Abughazaleh et al. | 439/676 |

* cited by examiner

*Primary Examiner* — Michael Zarroli
(74) *Attorney, Agent, or Firm* — Morris, Manning & Martin, LLP; Tim Tingkang Xia, Esq.

(57) ABSTRACT

A patch panel assembly and a patching module thereof are described. The patch panel assembly includes an outer frame and more than one patching module disposed on the outer frame. The patching module includes a registered jack (RJ) component and an insulation displacement contact (IDC) component which can be combined correspondingly, so that a plurality of RJ jacks and a plurality of IDC pins are electrically connected and assembled on the outer frame. The IDC component can further match two specifications of punch down tools to perform compression and wire bonding.

10 Claims, 11 Drawing Sheets

PATCH PANEL ASSEMBLY AND PATCHING MODULE THEREOF

BACKGROUND OF THE INVENTION

1. Field of Invention

The present invention relates to a patch panel for communication, and more particularly to a patch panel assembly having an outer frame and more than one patching module, and a patching module thereof.

2. Related Art

A patch panel for communication is always used for connecting multiple transmission lines. Multiple registered jacks (RJ jacks) are usually disposed in the front of the patch panel, for the transmission lines with RJ pins to plug. Multiple insulation displacement contact (IDC) holders are disposed at the rear side of the patch panel for connecting and fixing the transmission lines. A user can adjust the connection relationship of the transmission lines connected in the front of and at the rear side of the patch panel quickly by replacing the transmission lines connected in the front of the patch panel, so as to change the communication and transmission path.

A known patch panel for communication consists of a front board frame, RJ jacks, IDC holders, and a circuit board. The RJ jacks and the IDC holders are individual members, and are mounted on the circuit board separately. With the increase of the number of necessary connection ports, the numbers of the RJ jacks and the IDC holders disposed in the patch panel are increased correspondingly. Thus, during manufacture and assembling, more heavy and complicated steps are demanded for completion. In addition, the larger number of the elements results in more difficult maintenance. If one element in the patch panel fails or is damaged, the whole patch panel may possibly be discarded as useless. Furthermore, in order to satisfy the requirements of consumers, patch panels with various numbers of connection ports usually need be provided, which have different assembling steps, and even need be manufactured with different equipment. The aforementioned problems will perplex production, manufacture, and maintenance of the patch panel.

IDC holder is a connector which is common in instruments and meters, computers, machines for offices, or communication systems. The IDC holder is configured with multiple IDC pins, and the IDC pins are terminals electrically connected to the transmission lines. The IDC pins are U-shaped metal sheets with the sharp end portions. The IDC pins lacerate insulating external packaging of the transmission lines by the sharp end portions, so that the transmission lines are retained in the slot between U-shaped metal sheets, and the U-shaped metal sheets clamp a conductive part (metal conductor) in the transmission lines to form electrical connection.

In order to connect the transmission lines to the IDC holders, a punch down is required. The punch down tool should correspond to a connection rabbet of the IDC holder, so as to extrude into the connection rabbet for wire bonding and compression. There are two specifications provided for the common IDC holders, namely, the specification 110 provided by AT&T and the specification KRONE provided by KRONE. The connection rabbets of the IDC holders of the two specifications are designed in different manners. Working personnel responsible for actual on-site installation must have tools for different specifications; otherwise, during the wire bonding and compression, the installation becomes inconvenient for it is limited by the punch down tools for the specifications 110 and KRONE which must be used separately.

SUMMARY OF THE INVENTION

In view of the above requirements, the present invention is a patch panel assembly and a patching module thereof.

A patch panel assembly according to an embodiment of the present invention comprises an outer frame and more than one patching module. The patching module is disposed in a setting port of the outer frame. The patching module comprises an RJ component and an IDC component. The RJ component comprises a front base and a plurality of RJ jacks disposed on the front base. The front base is disposed in the setting port, and the front base has a plurality of fasteners on its circumference. The IDC component comprises a rear base, a circuit unit disposed on the rear base, and a plurality of IDC holders extending from the rear base. One side of the circuit unit is an RJ connection surface, and the other side of the circuit unit is provided with a plurality of IDC pins. The plurality of IDC pins passes through the plurality of IDC holders and is placed therein. The rear base has a plurality of lumps corresponding to the plurality of fasteners, and the rear base is combined with the front base. The plurality of fasteners is buckled with the plurality of lumps. The plurality of RJ jacks contacts the RJ connection surface, so that the plurality of RJ jacks is electrically connected to the plurality of IDC pins through the circuit unit. The IDC holder has a connection rabbet, and the connection rabbet has a first compression slot and a second compression slot combined with the first compression slot.

In the aspect of the patching module, the circumference of the front base may further have a plurality of hooks, the outer frame has a plurality of hooking holes corresponding to the plurality of hooks, and the plurality of hooks is hooked by the plurality of hooking holes. The rear base has an accommodation space, and the circuit unit is disposed in the accommodation space. The connection rabbet of the IDC holder comprises a first linear slot, a second linear slot, and two isosceles trapezoidal slots. The first linear slot traverses horizontally the connection rabbet, and the second linear slot and the first linear slot are vertically crossed. The two isosceles trapezoidal slots are disposed nearby the opposite sides of the second linear slot and crossed with the first linear slot, with the upper bottoms thereof facing each other.

The patching modules of the modular design are easily manufactured in mass quantities. Since the RJ component and the IDC component can be buckled quickly, the patching module is easy for assembling. The patching module can be disposed on the outer frame conveniently, so that the patch panel assembly can be assembled easily, thereby efficiently enhancing the production quantity and speed of the patch panel assembly and the patching modules thereof. In addition, in use, a consumer can expand or cut down the patching modules at will according to the demand (the number of connection ports). When a patching module fails or is damaged, the user can perform replacement or maintenance only after taking out the failed or damaged patching module. The whole patch panel assembly need not be replaced when one element in the patch panel assembly fails or is damaged, so the patch panel assembly has economic benefit.

Furthermore, the design of the connection rabbet of the IDC holder is combined with the first compression slot and the second compression slot at the same time. The IDC holder can correspond to the punch down tools of the specification 110 and the specification KRONE together, and provide better compatibility than the IDC holder corresponding to a single specification.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
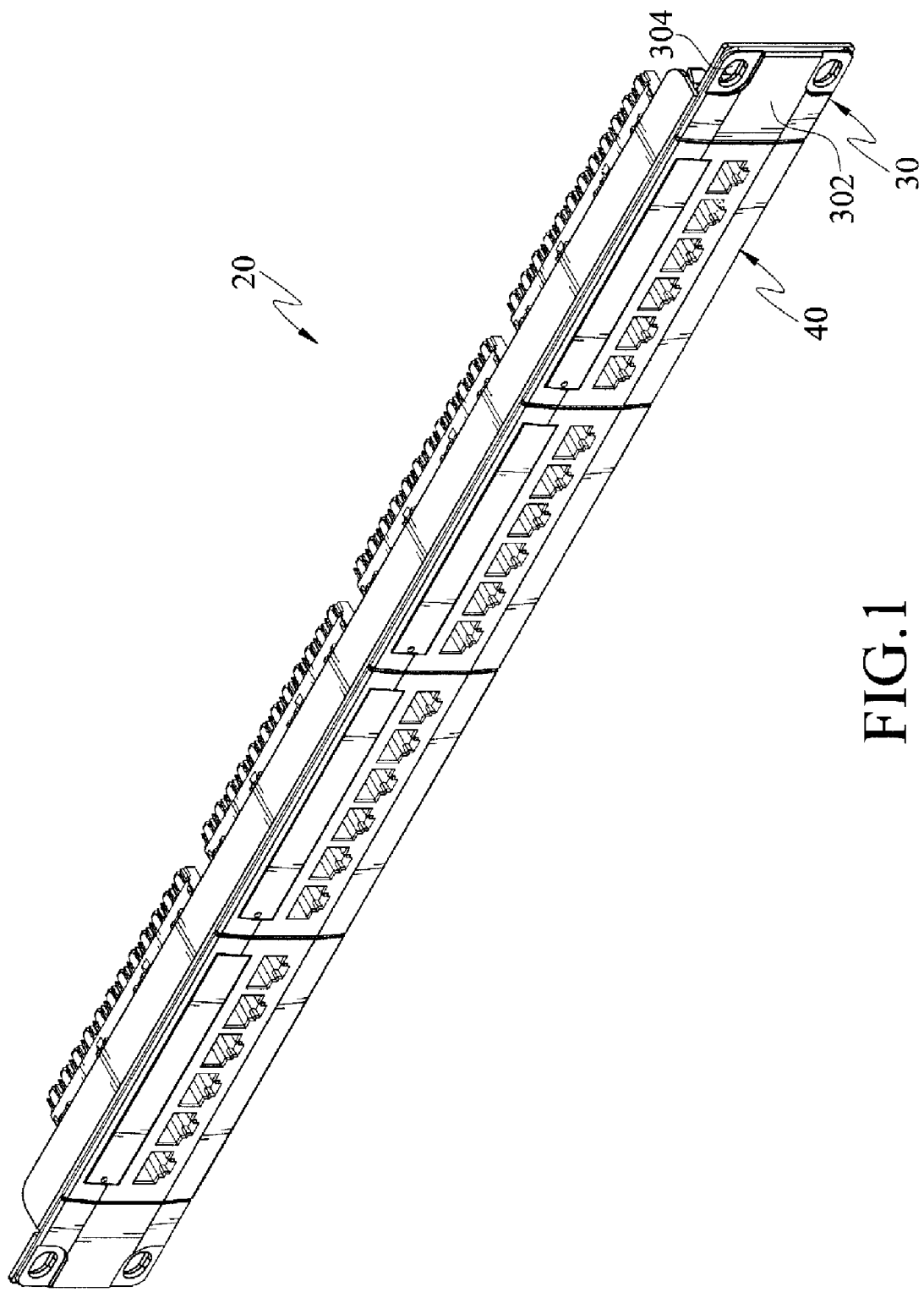
FIG. 1 is a schematic view of a patch panel assembly according to an embodiment of the present invention.

Referring to FIG. 1, a patch panel assembly 20 according to an embodiment of the present invention is shown. The patch panel assembly 20 comprises an outer frame 30 and multiple patching modules 40. The outer frame 30 has a setting port 300, and the more than one patching module 40 is disposed in the setting port 300. The outer frame 30 comprises at least one front wing panel 302. The front wing panel 302, extending from a lateral margin of the outer frame 30 by a predetermined width, can have at least one fixing hole 304, and fix the patch panel assembly 20 by the fixing hole 304.

Figure 2:
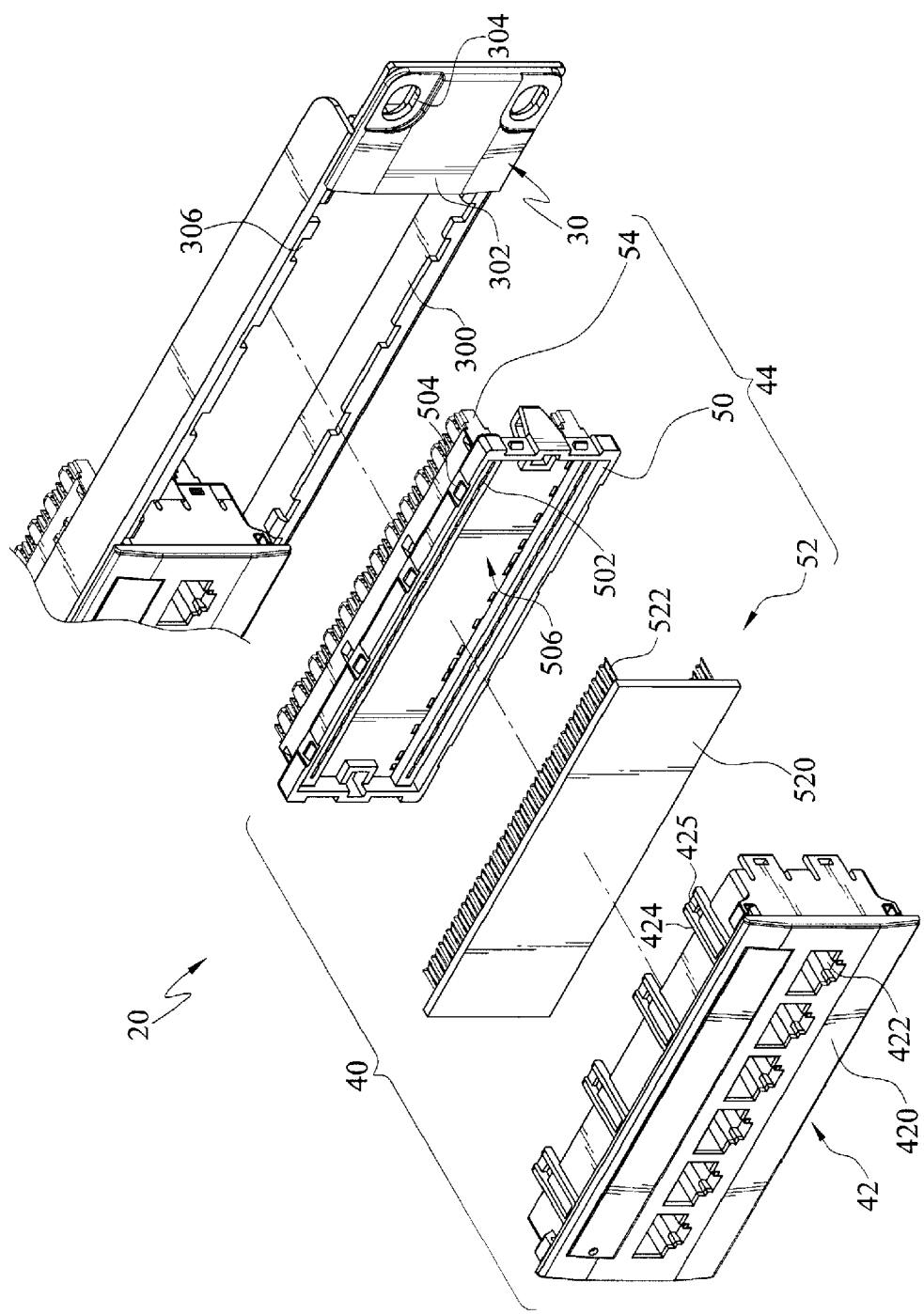
FIG. 2 is an exploded view of a patching module of a patch panel assembly according to an embodiment of the present invention.
Figure 3A:
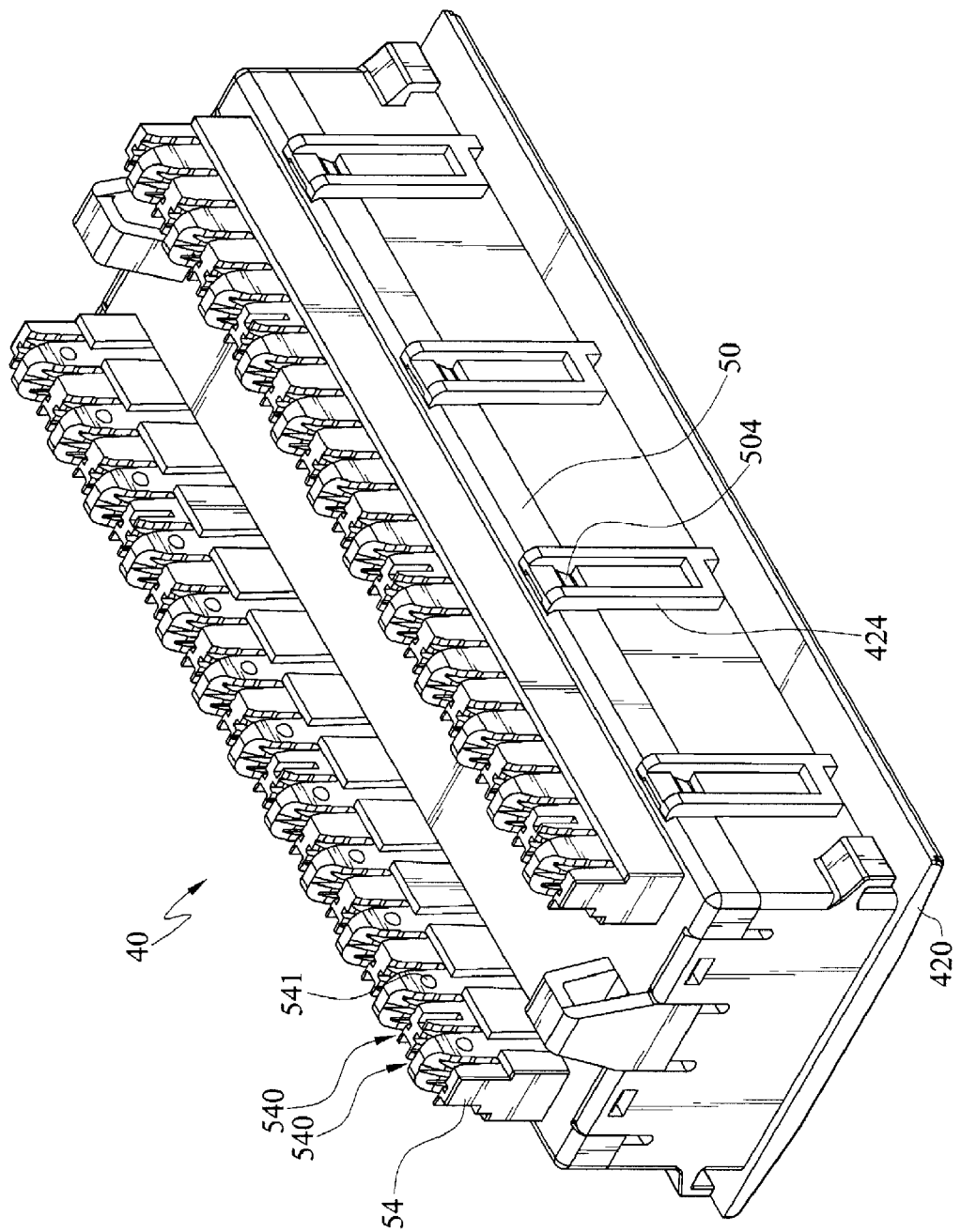
FIG. 3A is a schematic view of a patching module according to an embodiment of the present invention.
Figure 3B:
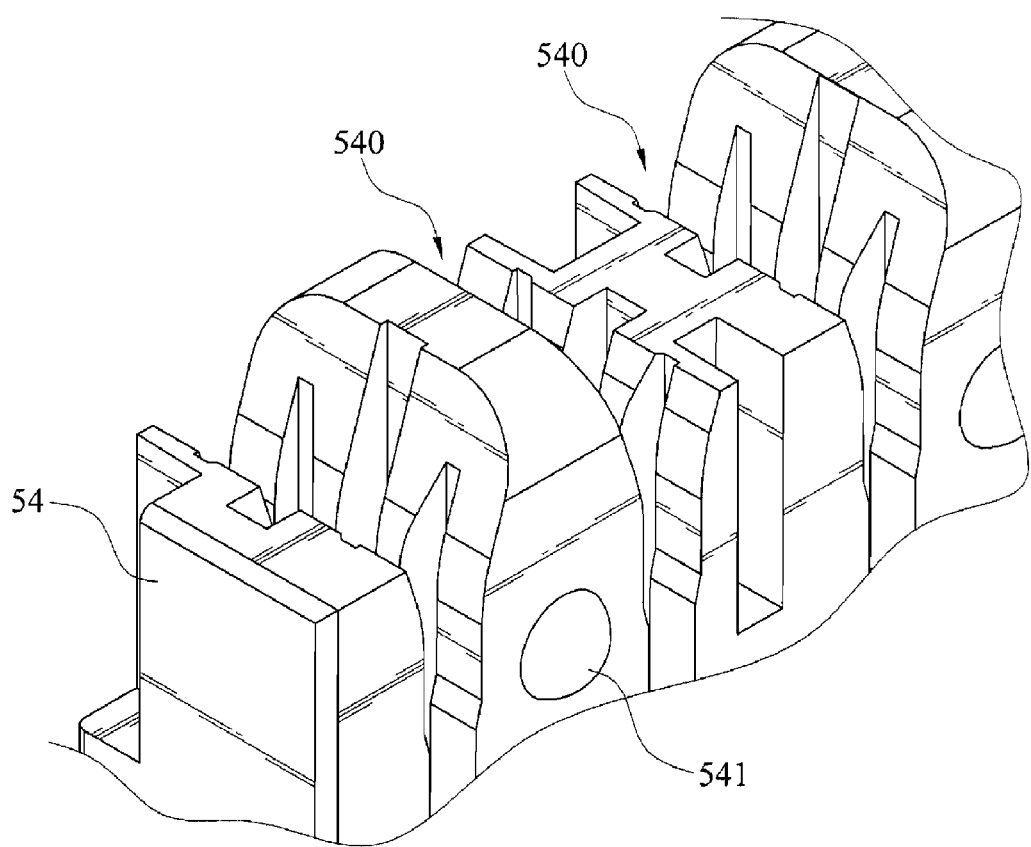
FIG. 3B is a local enlarged schematic view of FIG. 3A.

Referring to FIG. 2, a patching module 40 according to an embodiment of the present invention is shown, which comprises an RJ component 42 and an IDC component 44. The RJ component 42 comprises a front base 420 and a plurality of RJ jacks 422 disposed on the front base 420. The area of the front side of the front base 420 is larger than the area of the setting port 300 of the outer frame 30, so that the patching module 40 may be inserted into the setting port 300 from the front of the outer frame 30 to be retained in the outer frame 30. The RJ jack 422 is provided for an RJ pin (not shown) to plug. The front base 420 is configured in the setting port 300 of the outer frame 30, and has a plurality of fasteners 424 on its circumference. The fastener 424 has a fastening hole 425.

In this embodiment, the setting port 300 of the outer frame 30 further comprises a plurality of engage notches 306 on its inner wall. When the front base 420 is configured in the setting port 300 of the outer frame 30, the plurality of fasteners 424 is engaged in the plurality of engage notches 306. Thereby, the patching module 40 that has configured in the outer frame 30 can be positioned by this engagement means, so that the patching module 40 can be configured in the outer frame 30 more firmly.

The IDC component 44 comprises a rear base 50, a circuit unit 52, and a plurality of IDC holders 54. The circuit unit 52 is disposed in the rear base 50. The plurality of IDC holders 54 extends from the rear base 50. The rear base 50 has a plurality of through holes 502, which corresponds to the plurality of IDC holders 54. One side of the circuit unit 52 is an RJ connection surface 520, and the other side is provided with a plurality of IDC pins 522. The plurality of IDC pins 522 passes through the plurality of IDC holders 54 extending from the rear base 50 through the plurality of through holes 502 of the rear base 50 and is placed therein.

The rear base 50 has a plurality of lumps 504 corresponding to the plurality of fasteners 424 of the front base 420. The rear base 50 is combined with the front base 420, and the plurality of fasteners 424 buckles the plurality of lumps 504, so that the lumps 504 are buckled in the fastening holes 425 of the fastener 424. Furthermore, the plurality of RJ jacks 422 contacts the RJ connection surface 520, so as to be electrically connect to the plurality of IDC pins 522 through the circuit unit 52.

Persons skilled in the art should know that, although the RJ component 42 and the IDC component 44 are combined by a buckling means in this embodiment, actually, they can be combined through a lot of means, such as locking, covering, and adhering. Furthermore, the rear base 50 further comprises an accommodation space 506, and the circuit unit 52 is disposed in the accommodation space 506 of the rear base 50. The circuit unit 52 is sandwiched between the front base 420 and the rear base 50, so as not to be exposed outside. As such, the circuit unit 52 can be protected from being damaged by an external force or being stained with dust, thereby elongating the service life of the circuit.

Referring to FIGS. 3A, 3B, 4A, and 4B, the IDC holder 54 has a connection rabbet 540. The connection rabbet 540 has a first compression slot 540a and a second compression slot 540b combined with the first compression slot 540a. The side of the IDC holder 54 has a plurality of bumps 541.

In this embodiment, the first compression slot 540a is a compression slot of the specification 110. The second compression slot 540b is a compression slot of the specification KRONE. As a whole, the connection rabbet 540 comprises a first linear slot 542, a second linear slot 544, and two isosceles trapezoidal slots 546 and 548. The first linear slot 542 traverses horizontally the connection rabbet 540. The second linear slot 544 and the first linear slot 542 are vertically crossed. The two isosceles trapezoidal slots 546 and 548 are disposed nearby the opposite sides of the second linear slot 544 and crossed with the first linear slot 544, with the upper bottoms thereof facing each other.

The first linear slot 542 and the second linear slot 544 constitute a cruciform slot (the first compression slot 540a), which is suitable for the punch down tool of the specification 110 for compression and wire bonding. The first linear slot 54 and the two isosceles trapezoidal slots 546 and 548 constitute a slot (the second compression slot 540b), which is suitable for the punch down tool of the specification KRONE for compression and wire bonding.

In the detail design, the second linear slot 544 and the two isosceles trapezoidal slots 546 and 548 can be deeper than the first linear slot 542, so as to provide a space necessary for the punch down tool. In addition, persons skilled in the art should know that, the shapes of the first linear slot 542, the second linear slot 544, and the two isosceles trapezoidal slots 546 and 548 need not always be linear or isosceles, and the details such as the outer margin or corner certainly can be changed to become a lead angle or round.

Figure 4A:
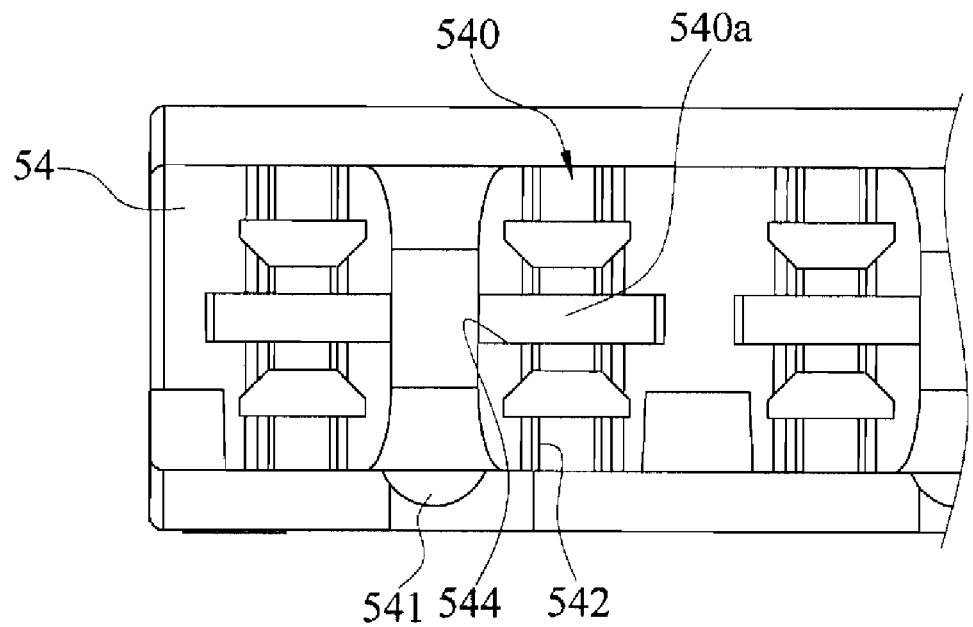
FIG. 4A is a schematic top view of FIG. 3B.
Figure 4B:
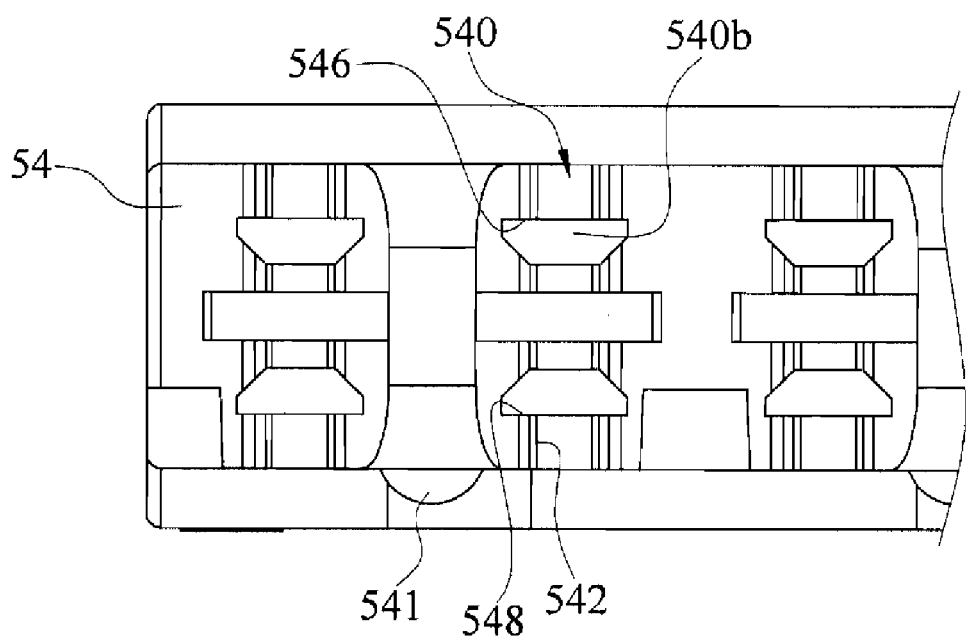
FIG. 4B is a schematic top view of FIG. 3B.
Figure 5:
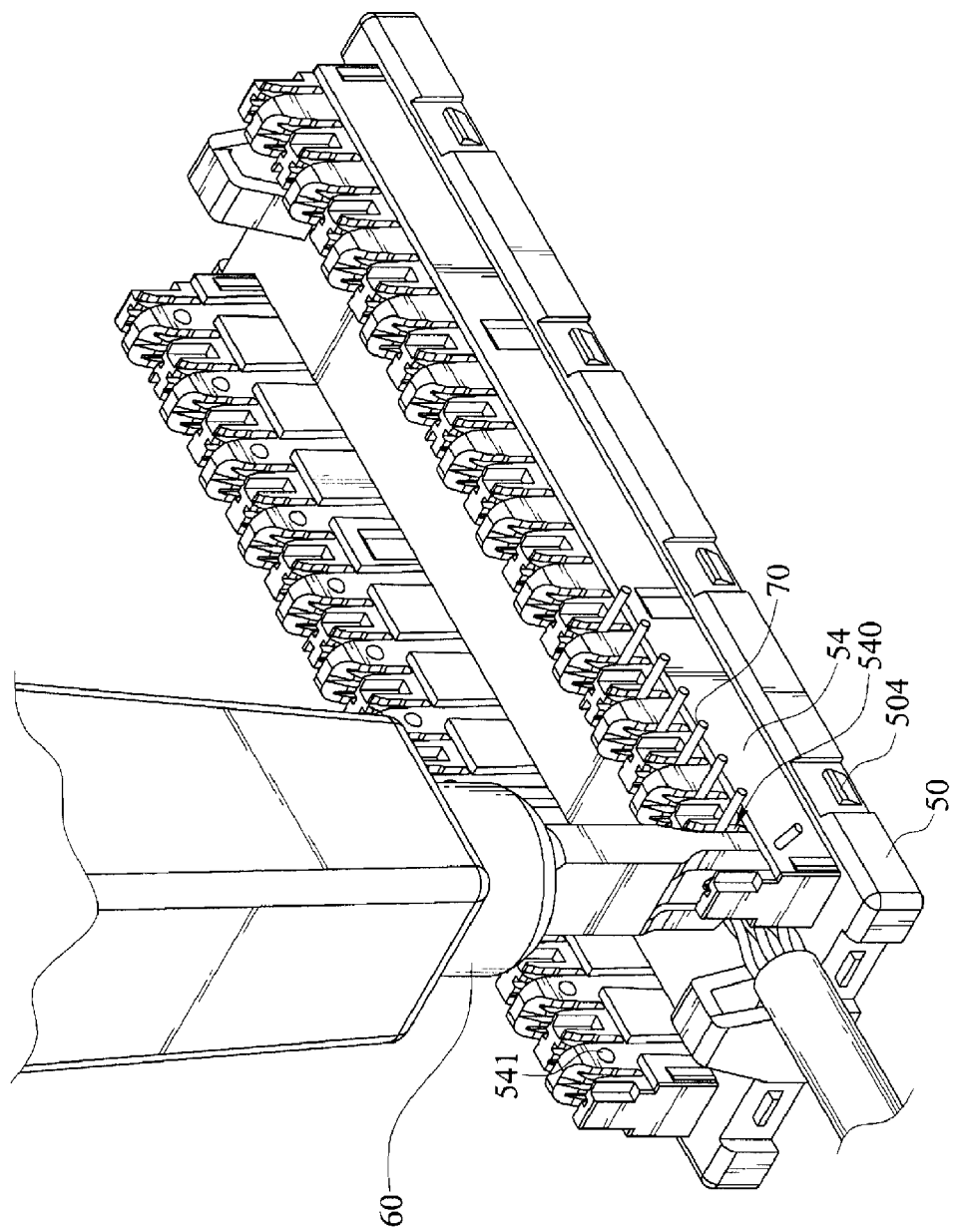
FIG. 5 is a schematic view of an IDC holder correspondingly using a punch down tool of the specification 110 according to an embodiment of the present invention.

Referring to FIG. 5, according to the embodiment of the present invention, the connection rabbet 540 of the IDC holder 54 has a first compression slot 540a (referring to FIG. 4). The first compression slot 540a can match the punch down tool 60 of the specification 110. Therefore, the punch down tool 60 of the specification 110 can perform compression and wire bonding on the IDC holder 54, so as to connect a transmission line 70 to the IDC holder 54.

Figure 6:
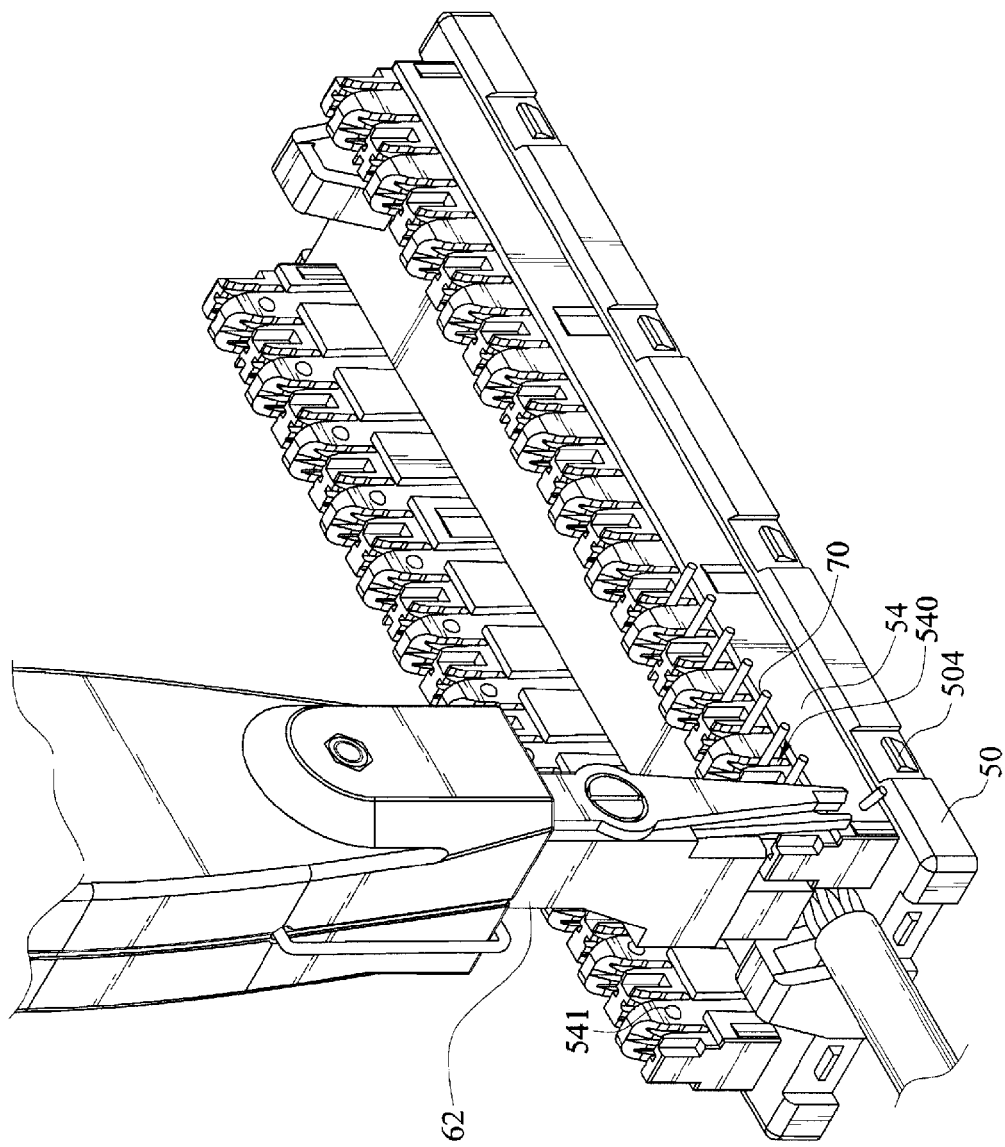
FIG. 6 is a schematic view of an IDC holder correspondingly using a punch down tool of the specification KRONE according to an embodiment of the present invention.

Referring to FIG. 6, according to the embodiment of the present invention, the connection rabbet 540 of the IDC holder 54 has a second compression slot 540b (referring to FIG. 4B). The second compression slot 540b can match the punch down tool 62 of the specification KRONE. Therefore, the punch down tool 62 of the specification KRONE can perform compression and wire bonding on the IDC holder 54, so as to connect the transmission line 70 to the IDC holder 54.

Figure 7:
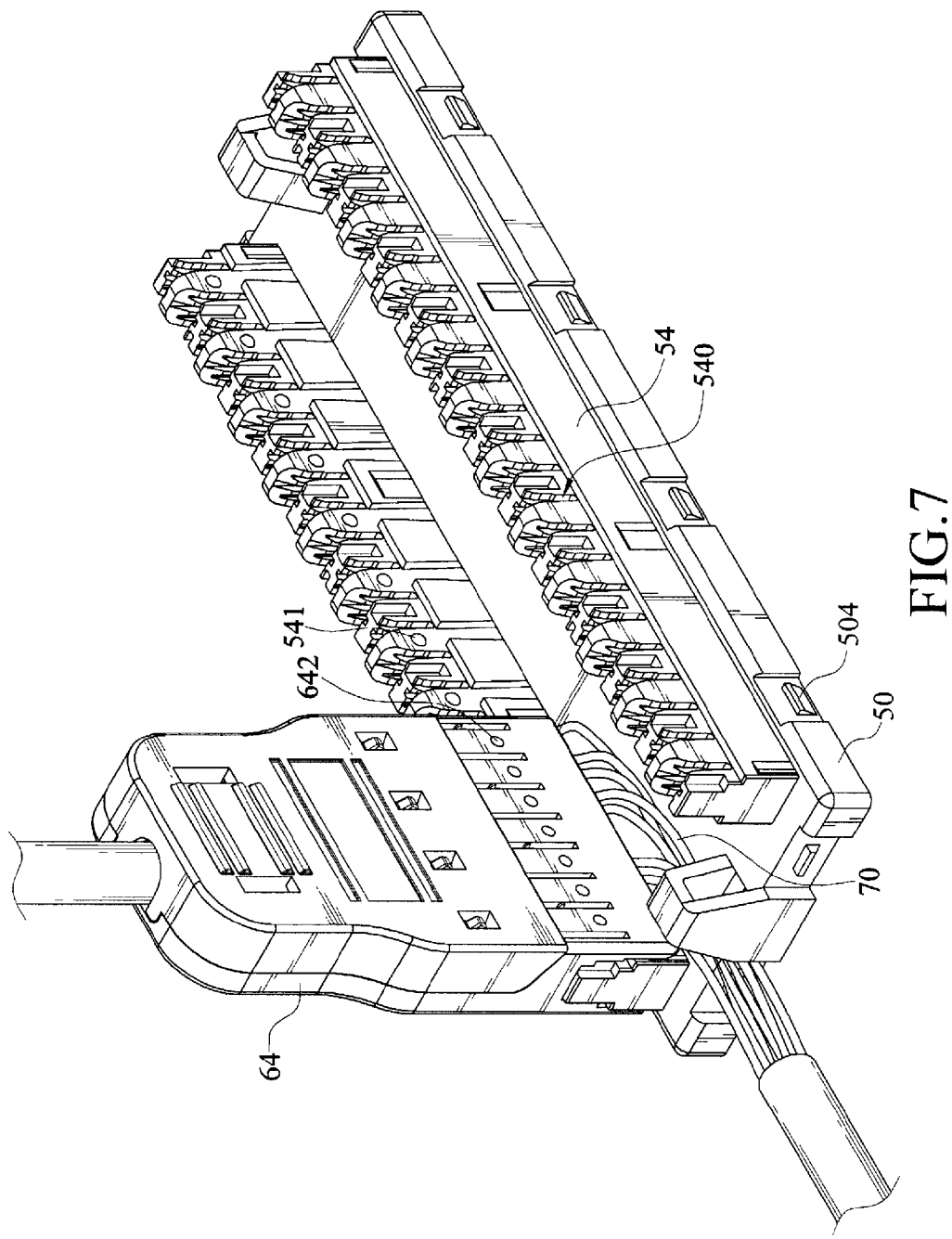
FIG. 7 is a schematic view of an IDC holder correspondingly using an insulation displacement contact plug according to an embodiment of the present invention.

Referring to FIG. 7, according to the embodiment of the present invention, the IDC holder 54 can correspondingly use an insulation displacement contact plug 64. The insulation displacement contact plug 64 is usually used for arranging or jumping wires, and the insulation displacement contact plug 64 can be inserted into the connection rabbet 540 of the IDC holder 54. The insulation displacement contact plug 64 has multiple positioning holes 642, and the bumps 541 of the IDC holder 54 correspond to the positioning holes 642 of the insulation displacement contact plug 64. When the insulation displacement contact plug 64 is mounted in the IDC holder 54, the positioning holes 642 are fitted on the bumps 541, so that the insulation displacement contact plug 64 is fixed in the IDC holder 54.

Figure 8:
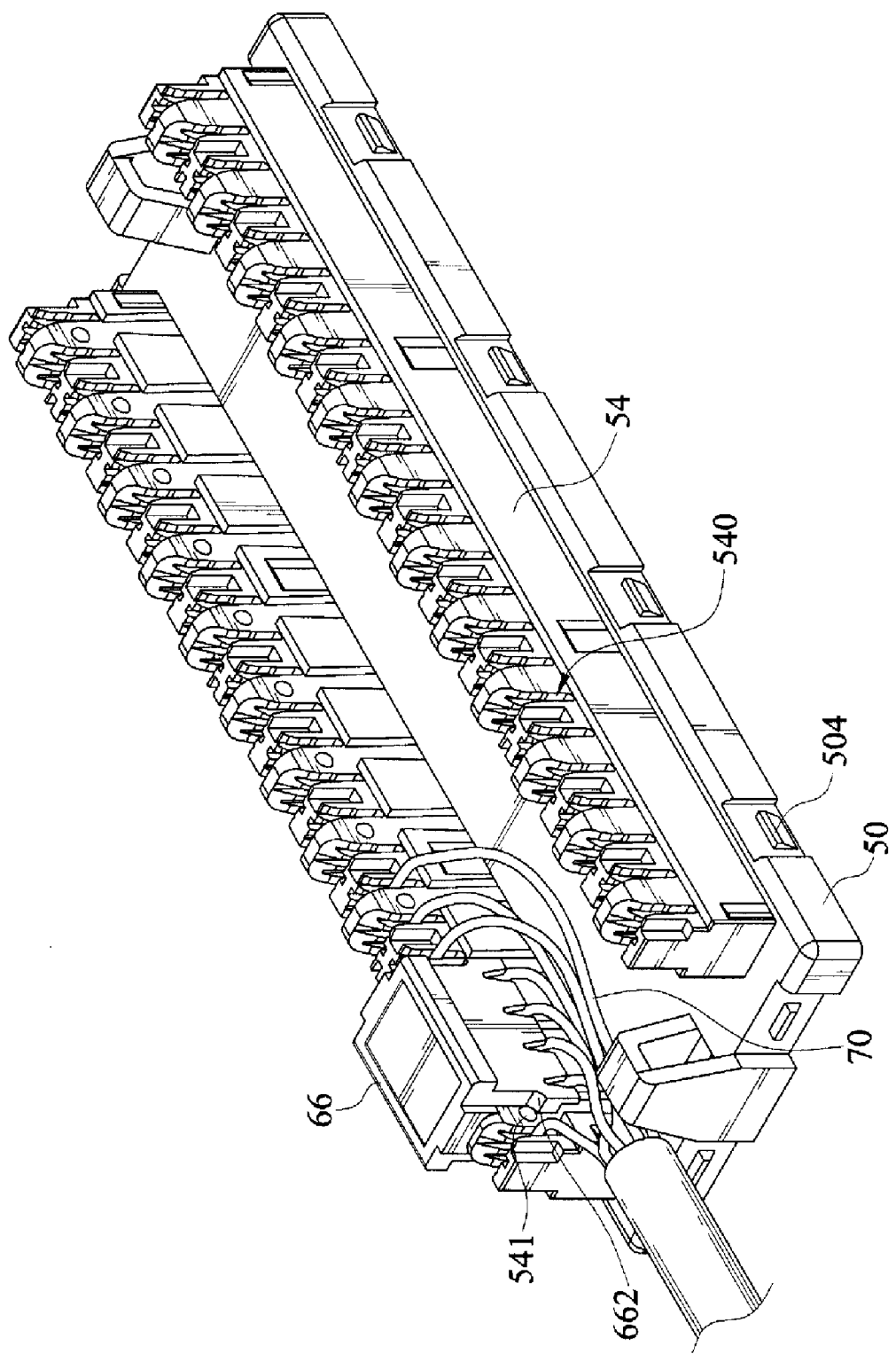
FIG. 8 is a schematic view of an IDC holder correspondingly using a protective cover according to an embodiment of the present invention.

Referring to FIG. 8, according to the embodiment of the present invention, the IDC holder 54 is provided with a protective cover 66. The protective cover 66 is used to protect the IDC holder 54 and the transmission line 70 connected to the IDC holder 54. The outer margin of the protective cover 66 has multiple fastening parts 662 corresponding to the bumps 541 of the IDC holder 54. The fastening part 662 is shaped in an arc, and matches the bump 541 shaped in a circle. When the protective cover 66 is mounted in the IDC holder 54, the fastening part 662 will secure the bump 541, so that the protective cover 66 is fixed on the IDC holder 54.

Figure 9:
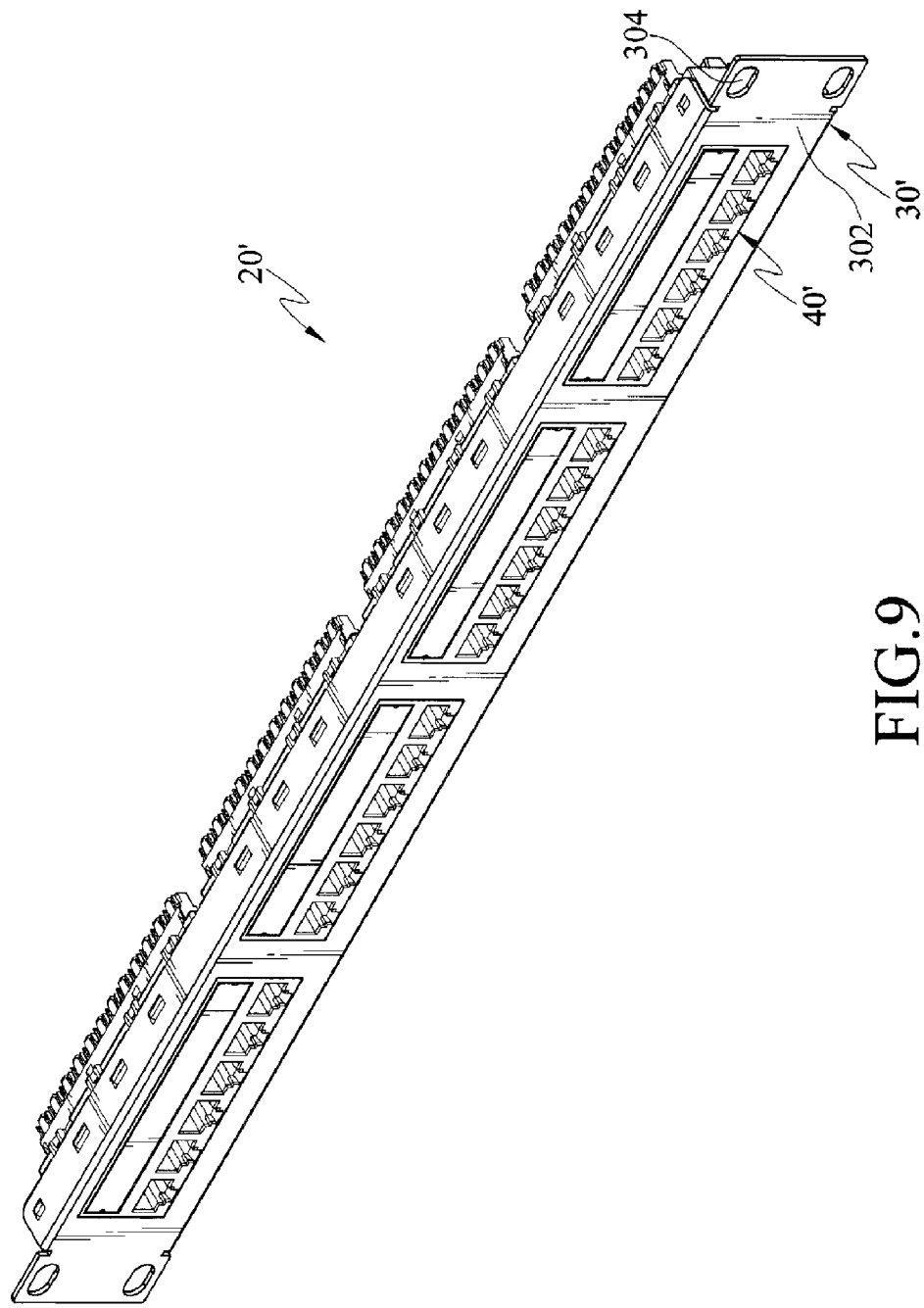
FIG. 9 is a schematic view of a patch panel assembly according to another embodiment of the present invention.
Figure 10:
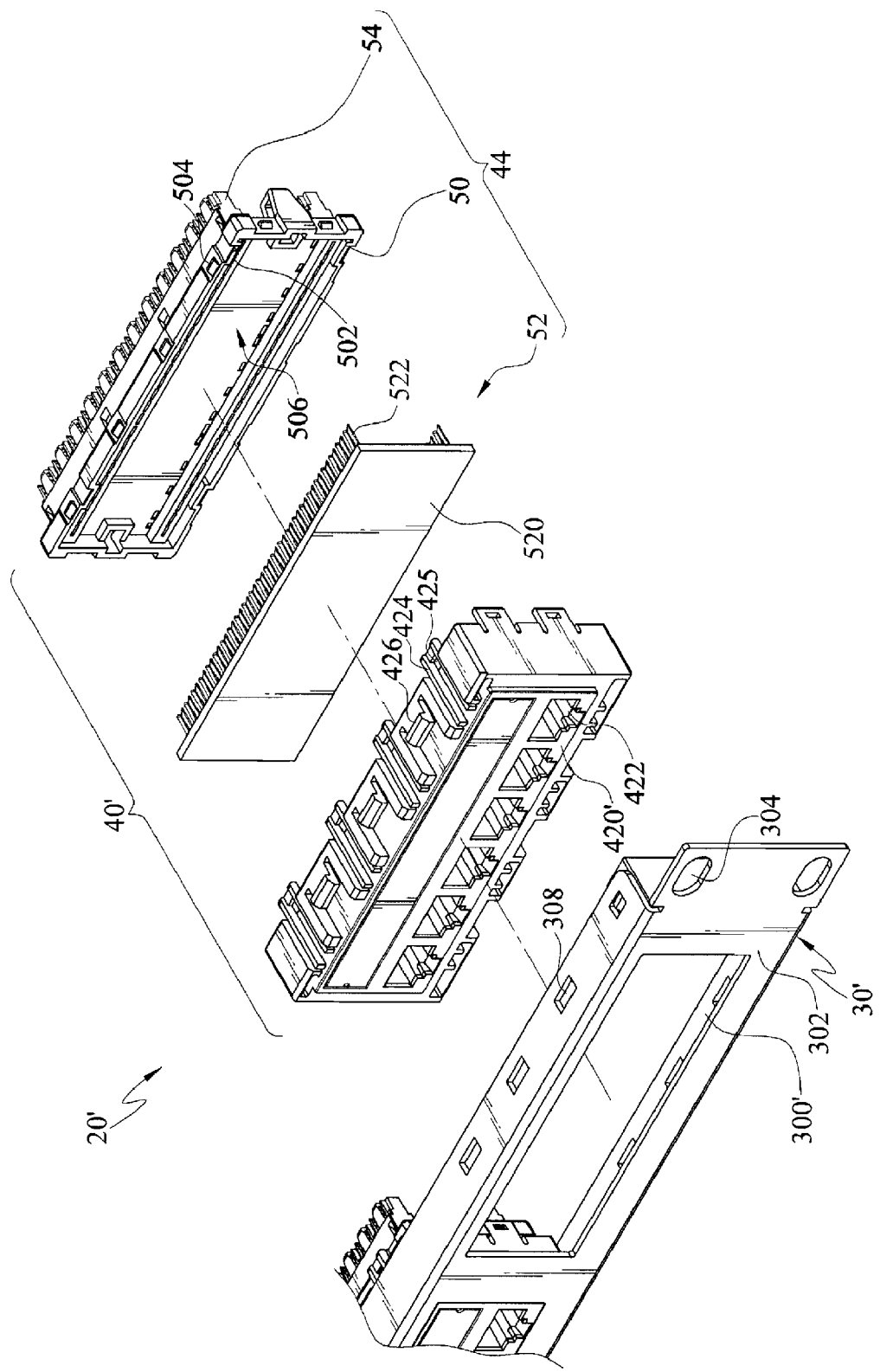
FIG. 10 is an exploded view of a patching module of a patch panel assembly according to another embodiment of the present invention.

Referring to FIGS. 9 and 10, a patch panel assembly 20' and patching modules 40' thereof according to another embodiment of the present invention are shown. Since the patch panel assembly 20' in this embodiment has substantially the same structure as that in the aforementioned embodiment, the same members use the same reference numerals and will not described repeatedly.

In this embodiment, the front base 420' of RJ component 42' of the patching module 40' has a plurality of hooks 426 on its circumference. The outer frame 30' has a plurality of setting ports 300' corresponding to the patching module 40' and a plurality of hooking holes 308 corresponding to a plurality of hooks 426. The patching module 40' is disposed in the corresponding setting port 300, and the plurality of hooks 426 is fastened in the plurality of hooking holes 308. Compared with the aforementioned embodiment, the patching module 40' in this embodiment is configured in the outer frame 30' from the rear side of the outer frame 30'.

What is claimed is:

1. A patch panel assembly, comprising:
   an outer frame, having a setting port; and
   more than one patching module, disposed in the setting port of the outer frame, wherein the patching module comprises:
   a registered jack (RJ) component, comprising a front base and a plurality of RJ jacks disposed in the front base, wherein the front base is configured in the setting port, and the front base has a plurality of fasteners on a circumference; and
   an insulation displacement contact (IDC) component, comprising a rear base, a circuit unit, and a plurality of IDC holders, wherein the circuit unit is disposed in the rear base, one side of the circuit unit is an RJ connection surface, the other side of the circuit unit is provided with a plurality of IDC pins, the plurality of IDC pins passes through the plurality of IDC holders extending from the rear base and is placed therein, the rear base has a plurality of lumps corresponding to the plurality of fasteners, the rear base is combined with the front base, the plurality of fasteners buckle the plurality of lumps, and the plurality of RJ jacks contacts the RJ connection surface, so that the plurality of RJ jacks is electrically connected to the plurality of IDC pins through the circuit unit, wherein the IDC holder has a connection rabbet, the connection rabbet comprises a first linear slot, a second linear slot, and two isosceles trapezoidal slots, the first linear slot traverses horizontally the connection rabbet, the second linear slot and the first linear slot are vertically crossed, and the two isosceles trapezoidal slots are disposed nearby the opposite sides of the second linear slot and crossed with the first linear slot, with upper bottoms thereof facing each other.

2. The patch panel assembly according to claim 1, wherein the outer frame further comprises at least one front wing panel, and the front wing panel extends from a lateral margin of the outer frame by a predetermined width.

3. The patch panel assembly according to claim 2, wherein the front wing panel further has at least one fixing hole.

4. The patch panel assembly according to claim 1, wherein the setting port of the outer frame further comprises a plurality of engage notches on an inner wall corresponding to the plurality of fasteners of the front base, and the plurality of fasteners are also engaged in the plurality of engage notches.

5. The patch panel assembly according to claim 1, wherein the front base further has a plurality of hooks on the circumference, the outer frame further has a plurality of hooking holes corresponding to the plurality of hooks, and the plurality of hooks are hooked in the plurality of hooking holes.

6. The patch panel assembly according to claim 1, wherein the rear base further has an accommodation space, and the circuit unit is disposed in the accommodation space of the rear base.

7. The patch panel assembly according to claim 1, wherein a side of the IDC holder further has a bump.

8. A patching module, comprising:
   a registered jack (RJ) component, comprising a front base and a plurality of RJ jacks disposed on the front base, wherein the front base has a plurality of fasteners on a circumference; and
   an insulation displacement contact (IDC) component, comprising a rear base, a circuit unit, and a plurality of IDC holders, wherein the circuit unit is disposed in the rear base, one side of the circuit unit is an RJ connection surface, the other side of the circuit unit is provided with a plurality of IDC pins, the plurality of IDC pins passes through the plurality of IDC holders extending from the rear base and is placed therein, the rear base has a plurality of lumps corresponding to the plurality of fasteners, the rear base is combined with the front base, the plurality of fasteners buckles buckle the plurality of lumps, and the plurality of RJ jacks contacts the RJ connection surface, so that the plurality of RJ jacks is electrically connected to the plurality of IDC pins through the circuit unit, wherein the IDC holder has a connection rabbet, the connection rabbet comprises a first linear slot, a second linear slot, and two isosceles trapezoidal slots, the first linear slot traverses horizontally the connection rabbet, the second linear slot and the first linear slot are vertically crossed, and the two isosceles trapezoidal slots are disposed nearby the opposite sides of the second linear slot and crossed with the first linear slot, with upper bottoms thereof facing each other.

9. The patching module according to claim 8, wherein the rear base further has an accommodation space, and the circuit unit is disposed in the accommodation space of the rear base.

10. The patching module according to claim 8, wherein a side of the IDC holder further has a bump.

* * * * *